United States Patent
Lee et al.

(10) Patent No.: US 9,985,733 B1
(45) Date of Patent: May 29, 2018

(54) SYSTEM AND METHOD FOR PERFORMING OVER-THE-AIR (OTA) TESTING OF A DEVICE UNDER TEST (DUT) HAVING AN INTEGRATED TRANSMITTER-ANTENNA ASSEMBLY

(71) Applicant: Keysight Technologies, Inc., Minneapolis, MN (US)

(72) Inventors: Gregory S. Lee, Mountain View, CA (US); Christopher Coleman, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 9 days.

(21) Appl. No.: 15/359,190

(22) Filed: Nov. 22, 2016

(51) Int. Cl.
*H04B 17/29* (2015.01)
*H04B 17/15* (2015.01)

(52) U.S. Cl.
CPC .............. *H04B 17/29* (2015.01); *H04B 17/15* (2015.01)

(58) Field of Classification Search
CPC ................................ H04B 17/29; H04B 17/15
USPC ......................................................... 455/67.11
See application file for complete search history.

(56) References Cited

U.S. PATENT DOCUMENTS

| 8,212,718 | B2 | 7/2012 | Utagawa et al. | |
|---|---|---|---|---|
| 8,295,777 | B1 * | 10/2012 | Yenney | H04W 24/06 455/435.1 |
| 8,467,756 | B2 | 6/2013 | Ozaki et al. | |
| 8,502,546 | B2 | 8/2013 | Nyshadham et al. | |
| 8,941,401 | B2 | 1/2015 | Pagani | |
| 9,331,751 | B2 * | 5/2016 | Sikina | H04B 5/0043 |
| 9,588,173 | B2 | 3/2017 | Isaac et al. | |
| 9,800,355 | B1 * | 10/2017 | Lee | H04B 17/17 |
| 2009/0153158 | A1 * | 6/2009 | Dunn | G01R 31/2822 324/762.01 |
| 2009/0295415 | A1 * | 12/2009 | Pessoa | G01R 31/2884 324/750.01 |

(Continued)

FOREIGN PATENT DOCUMENTS

| CN | 104764938 A | 7/2015 |
|---|---|---|
| WO | 2016059140 A1 | 4/2016 |

OTHER PUBLICATIONS

Ozaktas et al., "Fractional Fourier optics," Journal of the Optical Society of America, vol. 12, No. 4, pp. 743-751 (1995).

(Continued)

*Primary Examiner* — Edward Urban
*Assistant Examiner* — Ralph H Justus

(57) ABSTRACT

A test system for testing a DUT includes a first array of probe elements located in the near field of the DUT antenna that is either mechanically translated or electrically scanned in a first direction while being electrically scanned in a second direction that is different from the first direction to sense a bounded radiation surface comprising RF signals transmitted by the DUT antenna. A test system receiver receives first near field values contained in the RF signals and inputs them to processing logic of the test system. A reference measurement apparatus of the test system detects the RF signals and obtains reference information therefrom. Processing logic of the test system uses the reference information to correct near field phase values contained in or derived from the first near field values for phase shift between the local oscillator (LO) of the DUT and the LO of the test system.

20 Claims, 8 Drawing Sheets

(56) References Cited

U.S. PATENT DOCUMENTS

| | | | |
|---|---|---|---|
| 2010/0135164 A1* | 6/2010 | Rofougaran | G06F 11/2294 370/248 |
| 2010/0308651 A1* | 12/2010 | Rofougaran | H01Q 1/2283 307/11 |
| 2012/0086612 A1 | 4/2012 | Linehan et al. | |
| 2013/0069831 A1* | 3/2013 | Friedman | H01Q 21/065 343/702 |
| 2014/0162568 A1* | 6/2014 | Laskar | H01L 28/75 455/67.14 |
| 2014/0162573 A1* | 6/2014 | Laskar | H04B 1/403 455/73 |
| 2014/0300519 A1 | 10/2014 | Estebe et al. | |
| 2015/0168486 A1 | 6/2015 | Isaac et al. | |
| 2015/0288077 A1* | 10/2015 | Friedman | H01Q 21/065 455/73 |
| 2017/0033062 A1 | 2/2017 | Liu et al. | |

OTHER PUBLICATIONS

Bucci et al., "Far-field pattern determination from the near-field amplitude on two surfaces," IEEE Transactions on Antennas and Propagation, vol. 38, No. 11, pp. 1772-1779 (1990).

Gerchberg et al., "A practical algorithm for the determination of phase from image and diffraction plane pictures," Optik, vol. 35, No. 2, pp. 237-246 (1972).

English language machine translation of CN104764938, published Jul. 8, 2015.

* cited by examiner

SYSTEM AND METHOD FOR PERFORMING OVER-THE-AIR (OTA) TESTING OF A DEVICE UNDER TEST (DUT) HAVING AN INTEGRATED TRANSMITTER-ANTENNA ASSEMBLY

BACKGROUND

In the next generation of wireless infrastructure (e.g., base stations, backbone, etc.) and customer handsets is called $5^{th}$ generation mobile networks or $5^{th}$ generation wireless systems hereinafter referred to as "5G". 5G is very ambitious and involves millimeter-wave frequency usage, compact phased arrays, and an unprecedented amount of electronic integration. Not only will the transmitters and receivers be integrated into transceivers, but transceivers will be integrated with patch antennas or antenna arrays. The integrated transceiver and antenna or antenna array is referred to hereinafter as an "integrated transceiver-antenna assembly." In the 5G integrated transceiver-antenna assembly, there will be no traditional connector from the radio electronics to the antenna. For example, the transceiver-antenna assembly may be in the same integrated circuit (IC) package or may be in separate IC packages that are interfaced with one another via, for example, a ball grid array (BGA) interface. In either case, the entire radio, including its antenna or antenna array and its transceiver, will be a single indivisible unit. Therefore, there will be no antenna ports that are accessible from the outside of the unit for connection with an external test system.

Nevertheless, radio manufacturers will want their units tested for all of the usual characteristics, e.g., receiver sensitivity, both without and with interference present, total transmit power, error vector magnitude (EVM) of modulation formats, antenna radiation pattern, etc. All of these parameters must be measured and studied in great detail during the product design phase. In the manufacturing phase, the characterization can be winnowed down, but the speed of testing becomes paramount in order to keep cost down and to be competitive with rival vendors.

The non-separable nature of an integrated transceiver-antenna assembly renders traditional transceiver testing methods useless. Traditionally, one disconnects the antenna and performs all of the receiver and transmitter tests by connecting test equipment to the radio's connector. However, no such connector will be available in the 5G units. Furthermore, the non-separable nature of the 5G integrated transceiver-antenna assembly introduces completely new challenges in testing the antenna itself. Traditional far field test chambers are large and expensive, and therefore manufacturers are eager for compact antenna test solutions, such as near field test systems. However, in order to apply Fourier transform methods to convert near field data to far field radiation patterns, both amplitude and phase information is needed in the near field sampling. When the antenna can be disconnected, this is straightforward to achieve because one can simply use a two-port network analyzer with the antenna of the device under test (DUT) as Port 1 and a calibrated antenna or horn as Port 2. However, when the antenna of the DUT is inseparable from the transceiver of the DUT, phase information can be unreliable because the phase of the local oscillator (LO) of the DUT is likely to drift relative to the phase of the LO of the test equipment.

Also, the speed at which testing is performed is an important issue that is not adequately addressed by any of the known or proposed over-the-air (OTA) test solutions. Many companies have been proposed deploying multiple horns fixed in the far field to try to speed up the measurement of radiation patterns. The problem with such proposals is that, because a far field pattern is a distribution over a sphere and not a plane, the DUT would still need to be gimbaled over azimuth and elevation degrees of freedom rather than over X and Y translation degrees of freedom. If N horns are used to acquire signals simultaneously, a speed-up factor of N can be achieved when scanning a plane or a cylinder, but one encounters frequent redundant azimuth-elevation coordinate access when scanning a sphere. Thus, the speed-up factor is less than N.

Furthermore, with the advent of 5-bit to 6-bit amplitude and phase control of every antenna element in the DUT's patch array, the variety of radiation patterns that a 5G system designer has in his arsenal is huge. Multiplying this by the number of carrier frequencies at which the designer typically wishes to test, and doubling that for both polarizations to be tested, the amount of test data that has to be acquired becomes enormous. In such cases, due to the enormity of the data to be acquired, an entire day may be required to test a single antenna array. Therefore, a large speed-up factor in the amount of time that is required for testing is needed.

Accordingly, a need exists for a test system and method for performing OTA testing of a DUT having an integrated transceiver-antenna assembly that are capable of performing testing in a relatively short amount of time, in a relatively small area and at relatively low cost.

SUMMARY

The present embodiments are directed to a test system, a test method and a computer program for performing OTA testing of a DUT having a DUT transmitter and a DUT antenna that are integrated together in a package that does not include a connection port for interfacing the test system with the DUT antenna. The DUT transmitter generates radio frequency (RF) signals comprising a bounded radiation surface that are transmitted over the air by the DUT antenna.

The test system comprises a first array of at least N probe elements, a reference measurement apparatus, a mechanical translation system, and a test instrument. The first array of at least N probe elements is positioned in the near field of the DUT antenna. N is a positive integer that is greater than or equal to 2. Each of the probe elements detects the RF signals and generates respective electrical signals comprising first near field values. The reference measurement apparatus acquires at least first reference information from the RF signals. The test instrument comprises a first receiver, first switching logic and processing logic. The mechanical translation system mechanically translates the first array of at least N probe elements in at least a first direction over M positions within the near field of the DUT antenna while the first receiver causes the first switching logic to electrically scan the first array of N probe elements in at least a second direction that is different from the first direction to acquire an M-by-N array of the first near field values, where M is a positive integer that is greater than or equal to 2. The processing logic is configured to use the first reference information to phase correct first near field phase values contained in or derived from the M-by-N array of the first near field values for phase drift between an LO of the DUT and an LO of the test system.

The method comprises steps of:

with a mechanical translation system of a test system, mechanically translating a first array of at least N probe elements in at least a first direction over M positions within a near field of the DUT antenna, where N and M are positive integers that are greater than or equal to 2;

with a first receiver and first switching logic of the test system, electrically scanning the probe elements in a second direction that is different from the first direction as the array is mechanically translated in the first direction to acquire the RF signals comprising the bounded radiation surface;

in the first receiver of the test system, generating an M-by-N array of first near field values from the acquired RF signals;

with a reference measurement apparatus of the test system, detecting the RF signals and generating first reference information associated with the detected RF signals; and in processing logic of the test system, using the first reference information to phase correct first near field phase values contained in or derived from the M-by-N array of first near field values for phase drift between an LO of the DUT and an LO of the test system.

The computer program comprises first, second and third code segments. The first code segment receives first near field values from a first receiver of the test system. The first near field values are contained in electrical signals generated by probe elements of a first array of at least N probe elements of the test system positioned in a near field of the DUT antenna and mechanically translated in at least a first direction over M positions while being electrically scanned in a second direction that is different from the first direction, where N and M are positive integers that are greater than or equal to 2. The second code segment receives first reference information generated by a reference measurement apparatus of the test system that detects the RF signals and generates the first reference information therefrom. The third code segment uses the first reference information to phase correct first near field phase values contained in or derived from the first near field values for phase drift between an LO of the DUT and an LO of the test system.

These and other features and advantages will become apparent from the following description, claims and drawings.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
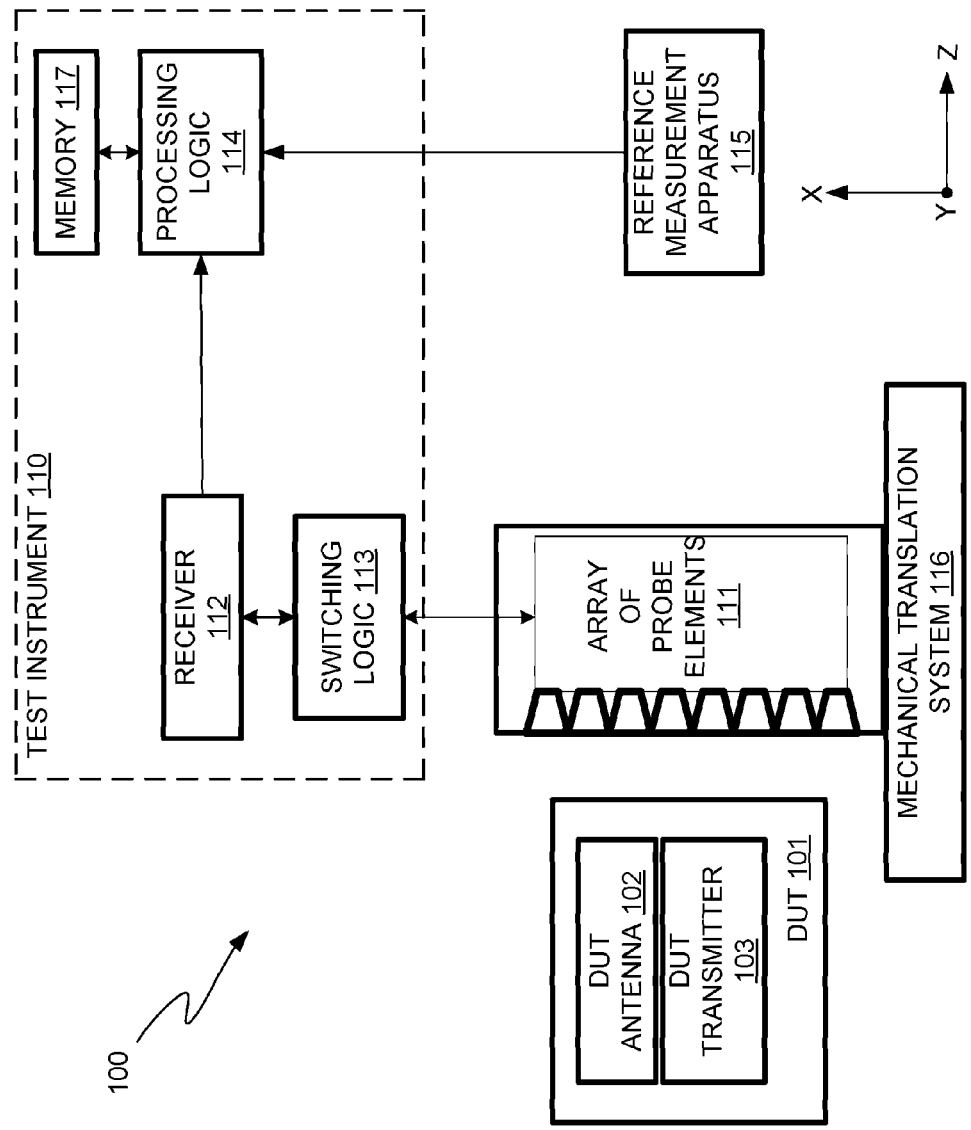
FIG. 1 illustrates a block diagram of the test system in accordance with a representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.

In accordance with embodiments described herein, a test system and method are provided for testing a DUT having an antenna and a transmitter that are integrated together in a package that does not have an externally-accessible connection port for interconnecting the test system with the antenna. The test system is capable of performing OTA testing on the DUT in a relatively short amount of time, in a relatively small area and at relatively low cost. The test system includes a first array of probe elements, a test instrument and a reference measurement apparatus. The test instrument comprises a first receiver, first switching logic and processing logic. The first array of probe elements is located in the near field of the DUT antenna and is either mechanically translated or electrically scanned by the test system in a first direction while being electrically scanned in a second direction that is different from the first direction to sense a bounded radiation surface comprising RF signals transmitted by the DUT antenna. The first receiver receives first near field values contained in the RF signals comprising the bounded radiation surface. The first receiver inputs the first near field values to the processing logic. A reference measurement apparatus of the test system also detects the RF signals and obtains reference information therefrom that is inputted to the processing logic. The processing logic uses the reference information to correct near field phase values contained in or derived from the first near field values for phase shift between the LO of the DUT and the LO of the test system.

The reference measurement apparatus can have various configurations. In accordance with one representative embodiment, the reference measurement apparatus includes a second receiver and a lens. The lens is disposed in between the DUT and the second receiver and creates an effect that the second receiver is positioned in the far field of the DUT antenna. In accordance with this embodiment, the reference information comprises far field amplitude and/or phase values measured by the second receiver that the processing logic of the test instrument uses to correct the near field phase values contained in or derived from the first near field values for phase shift between the LO of the DUT and the LO of the test system.

In accordance with another representative embodiment, the reference measurement apparatus includes a second array of probe elements, a second receiver and second switching logic. The second array of probe elements is located in the near field of the DUT antenna and is offset in the second direction from the first array of probe elements such that there is no overlap in the second direction between the first and second arrays of probe elements. In accordance with this embodiment, the first and second arrays of probe elements are mechanically translatable in the first direction. The test system holds the second array of probe elements stationary while mechanically translating the first array of probe elements in the first direction as the first switching logic electrically scans the probe elements of the first array in the second direction to acquire the first near field values. During the mechanical translation and electrical scanning of the first array, the second receiver controls the second switching logic to electrically scan the second array of probe elements in the second direction to acquire first reference information from the probe elements of the second array. The test system then holds the first array of probe elements stationary while mechanically translating the second array of probe elements in the first direction as the second receiver controls the second switching logic to electrically scan the probe elements of the second array in the second direction to acquire second near field values. During the mechanical translation and electrical scanning of the second array, the first receiver controls the first switching logic to acquire second reference information from the probe elements of the first array. The processing logic receives the first and second near field values and the first and second reference information and uses the first and second reference information to correct first and second near field phase values, respectively, contained in or derived from the first and second near field values, respectively, for phase drift between the LO of the DUT and the LO of the test system.

In accordance with another representative embodiment, the array of probe elements is an 2M-by-N array of probe elements, where M and N are positive integers that are greater than or equal to 2. In accordance with this embodiment, a first half of the array acts as part of the reference measurement apparatus while a second half of the array is electrically scanned in the first and second directions, i.e., a two-dimensional (2-D) electrical scan of the second half of the array is performed, to acquire a first M-by-N set of near field values. During the 2-D scan of the second half of the array, a single probe element in the first half of the array is monitored to acquire first reference information. Subsequently, the second half of the array acts as part of the reference measurement apparatus while first half of the array is electrically scanned in the first and second directions to acquire a second M-by-N set of near field values. During the 2-D scan of the first half of the array, a single probe element in the second half of the array is monitored to acquire second reference information. The first and second M-by-N sets of near field values and the first and second reference information are sent to the processing logic of the test system. The processing logic uses the first reference information to correct a first M-by-N set of near field phase values contained in or derived from the first M-by-N set of near field values. The processing logic uses the second reference information to correct a second M-by-N set of near field phase values contained in or derived from the second M-by-N set of near field values.

These representative embodiments and some modifications thereto are described below with reference to FIGS. 1-8. In the following detailed description, for purposes of explanation and not limitation, exemplary, or representative, embodiments disclosing specific details are set forth in order to provide a thorough understanding of an example of the manner in which the present invention can be embodied. However, it will be apparent to one of ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

As used in the specification and appended claims, the terms "a," "an," and "the" include both singular and plural referents, unless the context clearly dictates otherwise. Thus, for example, "a device" includes one device and plural devices. Relative terms may be used to describe the various elements' relationships to one another, as illustrated in the accompanying drawings. These relative terms are intended to encompass different orientations of the device and/or elements in addition to the orientation depicted in the drawings. It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. The term "computer code," as that term is used herein, is intended to denote software and/or firmware designed for execution by a processor or processing core. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing core," or "processing logic," as those terms are used herein, encompass an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

As stated above, when the DUT antenna is inseparable from the DUT transceiver, the phase information collected by a single channel of test equipment can be rendered unreliable, or suspect, due to phase drift between the DUT LO and the test equipment LO. If the DUT LO coherence time is short, even switching from one probe element to the neighboring probe element within a given mechanically-accessed row of a two-dimensional (2-D) near field scan, the probe element-to-probe element relative phase value may be unreliable. The following discussion provides various representative embodiments for obviating the phase drift problem while providing test systems that perform testing relatively quickly, in a relatively small spatial area and at relatively low cost.

In the following discussion, the following terms have the following meaning. The term "near field values," at that term is used herein, denotes one or more of near field amplitude values, near field phase values and near field relative phase values. The term "near field phase values," as that term is used herein, denotes phase values that are contained in or are derived from corresponding near field values. As is known in the art, phase values can be measured directly and they can be derived from amplitude values or a combination of amplitude and relative phase values. In some embodiments, near field phase values are measured directly and in other embodiments they are derived from near field amplitude values or a combination of near field amplitude and relative phase values.

FIG. 1 illustrates a block diagram of the test system 100 in accordance with a representative embodiment for testing a DUT 101 having a DUT antenna 102 and a DUT transmitter 103 that are integrated together and electrically interconnected inside of a package having no externally-accessible antenna connection port for allowing the test system 100 to be electrically interconnected directly with the DUT antenna 102 or with the interconnection between the DUT antenna 102 and the DUT transmitter 103. The transmitter 103 is typically, but not necessarily, part of a transceiver that typically also includes a receiver. In all of the embodiments described herein, there is neither an RF connection nor an LO connection from the DUT 101 to the test system 100, although there may be, and typically are, direct current (DC), baseband and intermediate frequency (IF) connections between the DUT 101 and the test system 100. For ease of illustration and in the interest of brevity, the DC, baseband and IF connections are not shown in the figures or discussed herein.

The test system 100 comprises a test instrument 110, an array of probe elements 111 located in a near field of the DUT antenna 102 and electrically coupled to the test instrument 110, a reference measurement apparatus 115 electrically coupled to the test instrument 110, and a mechanical translation system 116 mechanically coupled to at least the array of probe elements 111. The test instrument 110 of the test system 100 comprises a receiver 112, switching logic 113, processing logic 114, and a memory device 117. The receiver 112 is electrically coupled to the array of probe elements 111 via the switching logic 113.

The test system 100 performs OTA testing of the DUT 101. During OTA testing of the DUT 101, the DUT antenna 102 transmits RF signals comprising a bounded radiation surface extending in at least first and second directions. The shape of the bounded radiation surface is not limited to being any particular shape and may be, for example, flat, curved, rectangular, oval, etc. The array of probe elements 111 is at least a 1-by-N array pf probe elements, where N is a positive integer that is greater than or equal to 2. The N probe elements are positioned along an imaginary line that is parallel to the second direction. The spacing, or pitch, between adjacent probe elements of the array of probe elements 111 is typically about one-half of the operating wavelength of the DUT 101. For demonstrative purposes, the first and second directions are assumed to be the Y- and X-directions, respectively, of an X, Y, Z Cartesian coordinate system. Therefore, the first and second directions will be referred to herein interchangeably as the "Y-direction" and the "X-direction" or as the "first direction" and the "second direction," respectively.

The array of probe elements 111 may be thought of as a wand that is movable in at least the Y-direction and will be referred to interchangeably herein as "the wand 111" or as the "array of probe elements 111." The wand 111 comprises anechoic absorbing material in which the probe elements are encapsulated, but with openings in the anechoic absorbing material through which portions of the probe elements are exposed to allow them to sense the bounded radiation surface emitted by the DUT antenna 102.

During OTA testing, the wand 111 is mechanically translated via the mechanical translation system 116 in the Y-direction over M positions as it is electrically scanned in the X-direction, where M is a positive integer that is greater than or equal to 2. The receiver 112 controls the switching logic 113 to electrically scan the probe elements in the X-direction as the wand 111 is mechanically translated in the Y-direction. The wand 111 typically includes a field effect transistor (FET) switching tree (not shown for clarity) that is controlled via the switching logic 113 to cause the electrical signals generated by the probe elements to be sequentially sampled and transferred via the switching logic 113 from the wand 111 to the receiver 112. It should be noted that other switching technologies, such as bipolar junction transistors (BJTs) or P-intrinsic-N(PIN) diodes, for example, may be used for this purpose. The inventive principles and concepts are not limited with respect to the types or configurations of switching devices that are used in the switching logic 113.

As a result of translating the wand 111 in the Y-direction over M positions while electrically scanning the array of N probe elements 111 in the X-direction, an M-by-N array of near field values are acquired by the receiver 112 and inputted to the processing logic 114. The near field values include near field amplitude values and/or near field phase values. As is known in the art, because near field phase values can be mathematically derived from, for example, amplitude values measured in both the near field and outside of the immediate near field, it is not necessary to acquire both near field amplitude and near field phase values.

As the receiver 112 acquires the near field values from the array of probe elements 111 and inputs them into the processing logic 114, the reference measurement apparatus 115 acquires reference information from the RF signals. As indicated above, and as described below, the reference measurement apparatus 115 can have various configurations and the reference information can be of various types. The reference measurement apparatus 115 inputs the reference information to the processing logic 114. The processing logic 114 performs a correction algorithm that uses the reference information to correct near field phase values contained in or derived from the near field values acquired by the receiver 112 for phase drift between the LO (not shown) of the DUT 101 and the LO of the test system 100.

The correction algorithm is typically implemented in software and/or firmware that is executed by the processing logic 114, which may be, for example, a microprocessor. The computer code comprising the software and/or firmware is typically stored in the memory device 117. While the memory device 117 is shown as being external to the processing logic 114, it may be external to or part of the processing logic 114. For illustrative purposes, the memory device 117 is shown in FIG. 1 as being external to the processing logic 114. The memory device 117 may be any suitable non-transitory computer-readable medium, including, for example, read only memory (ROM), random access memory (RAM) flash memory, programmable read only memory (PROM), erasable programmable read only memory (EPROM), optical memory devices, magnetic memory devices, etc.

Figure 2:
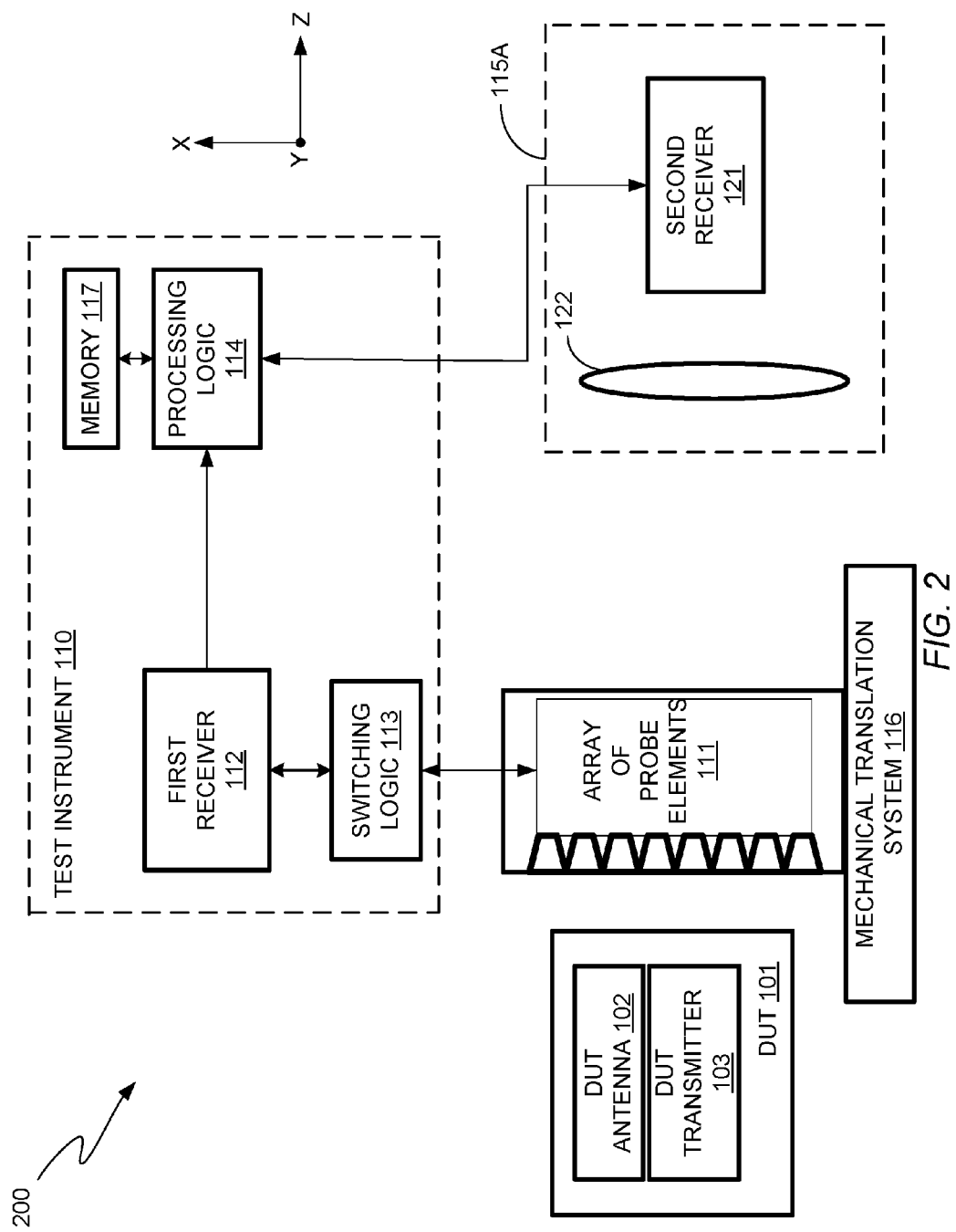
FIG. 2 illustrates a block diagram of the test system in accordance with another representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.
Figure 3:
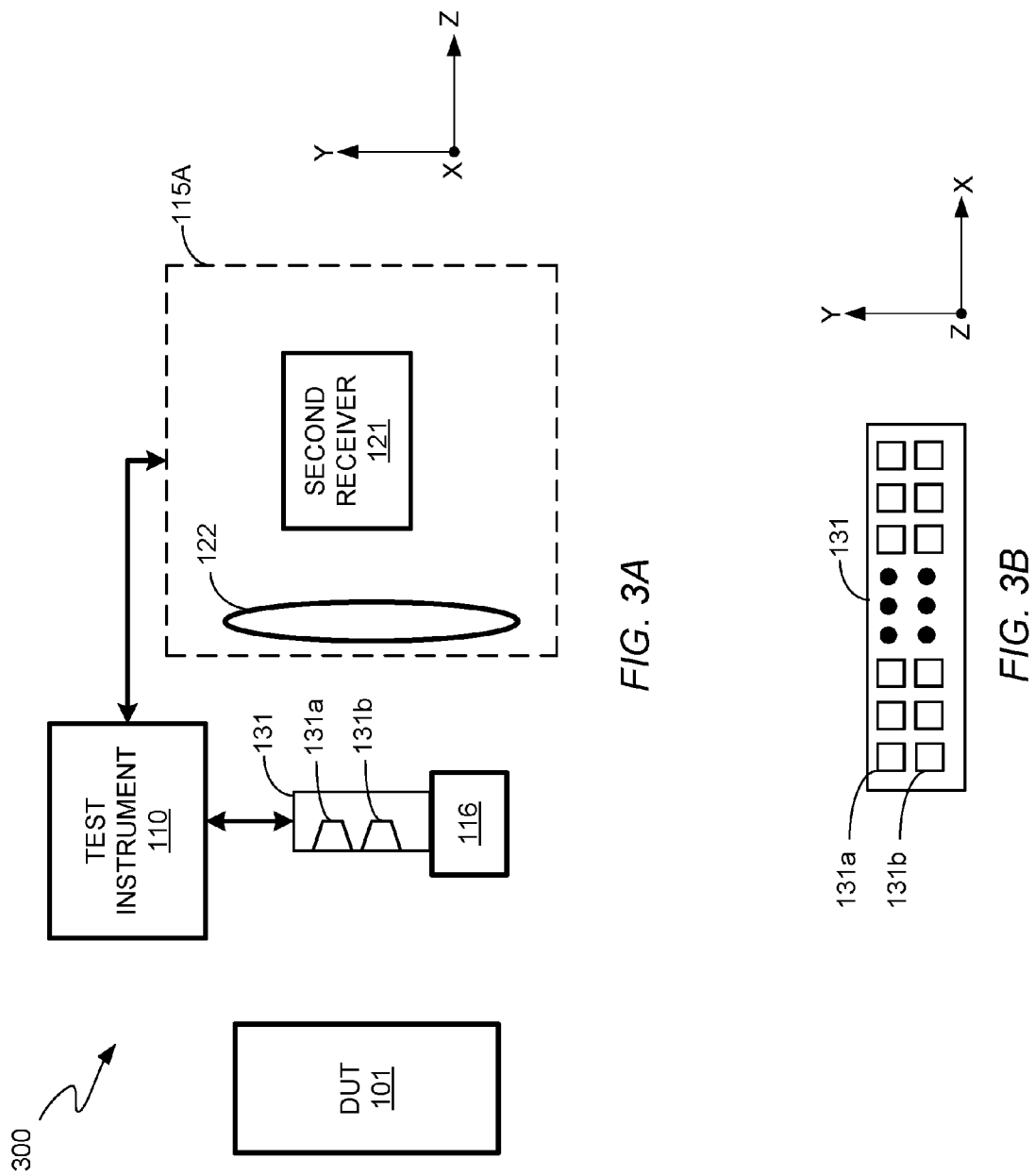
FIG. 3A illustrates a block diagram of the test system in accordance with another representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.
FIG. 3B illustrates a front-view block diagram of the array of probe elements shown in FIG. 3A.
Figure 4:
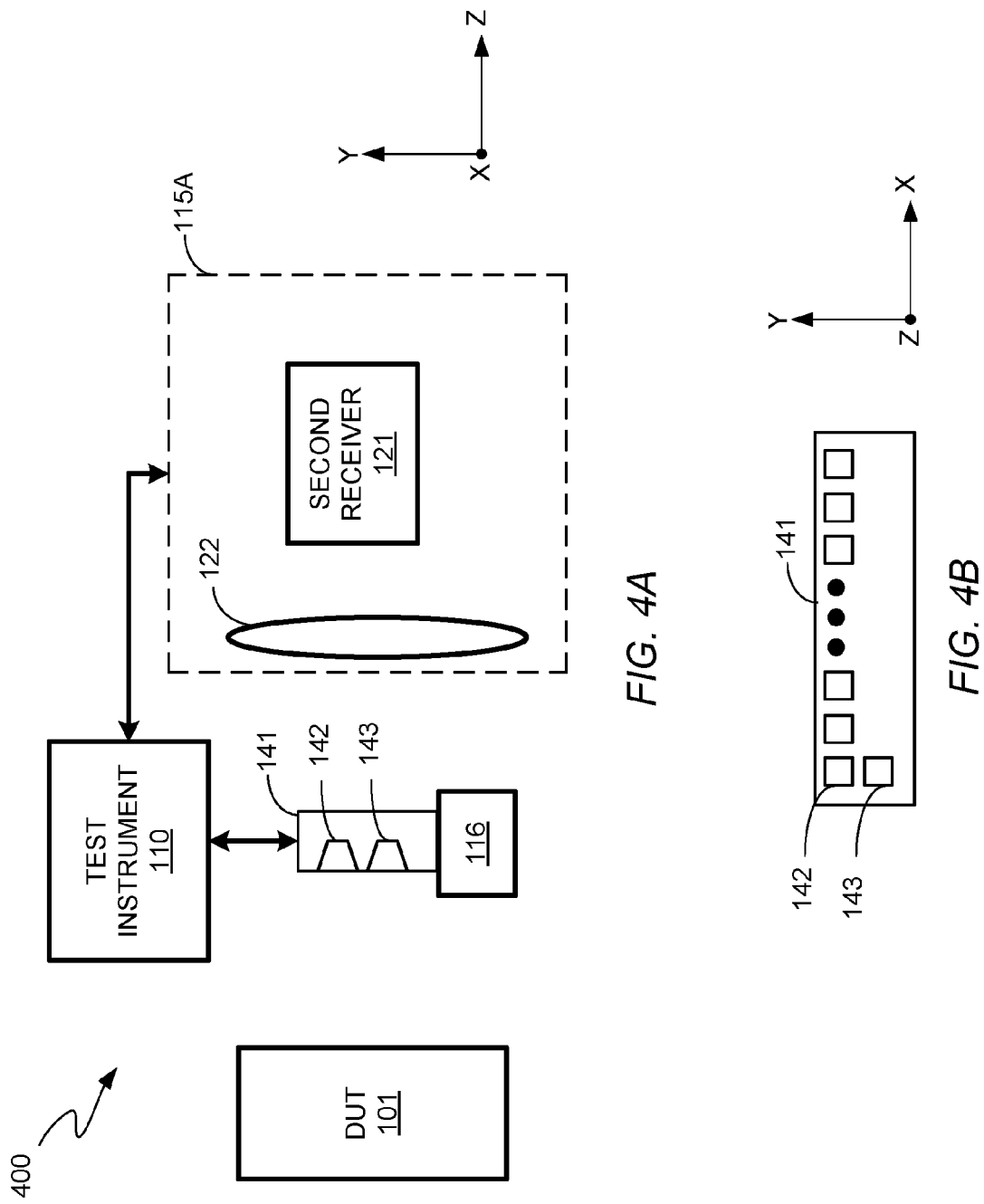
FIG. 4A illustrates a block diagram of the test system in accordance with another representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.
FIG. 4B illustrates a front-view block diagram of the array of probe elements shown in FIG. 4A.

FIG. 2 illustrates a block diagram of the test system 200 in accordance with another representative embodiment for testing the DUT 101. The test system 200 is identical to the test system 100 shown in FIG. 1 except that the block labeled reference measurement apparatus 115 in FIG. 1 has been replaced in FIG. 2 with a reference measurement apparatus 115A having a particular configuration. In accordance with this representative embodiment, the reference measurement apparatus 115A comprises a second receiver 121 and a lens 122. The lens 122 is interposed between the DUT antenna 102 and the second receiver 121 and creates the effect of the second receiver 121 being located in the far field of the DUT antenna 102. The lens 122 also improves collection efficiency and allows the test system 100 to be kept relatively compact in the Z-dimension compared to if the second receiver 121 is actually located in the far field of the DUT antenna 102. For example, if the second receiver 121 were actually located in the far field of the DUT antenna 102, the test system 200 would typically need to include a relatively large anechoic chamber, which would significantly increase the cost of the test system 200.

In accordance with this embodiment, the array of probe elements 111 is a 1-by-N array of probe elements, with the N probe elements being aligned with one another in the X-direction. In other words, the probe elements of the array 111 are located along an imaginary line that is parallel to the X-axis. Adjacent probe elements of the array 111 are spaced apart from one another by a constant spacing, or pitch, that is typically one-half of the operating wavelength of the DUT 101. During testing, the array of N probe elements 111 is mechanically translated via the mechanical translation system 116 in the Y-direction over M positions as it is electrically scanned in the X-direction. The first receiver 112 controls the switching logic 113 to electrically scan the probe elements in the X-direction as the array of probe elements 111 is translated in the Y-direction. As indicated above, the array of probe elements 111 typically includes an FET switching tree that is controlled via the switching logic 113 to cause the electrical signals generated by the probe elements to be sequentially sampled and transferred via the switching logic 113 from the array of probe elements 111 to the first receiver 112.

As a result of translating the array of probe elements 111 over M positions while electrically scanning the array of N probe elements 111 in the X-direction, an M-by-N array of near field values is acquired by the first receiver 112 and inputted to the processing logic 114. In accordance with this representative embodiment, the near field values include near field amplitude values and near field phase values. As the first receiver 112 acquires the near field amplitude and phase values from the array of probe elements 111 and inputs them into the processing logic 114, the second receiver 121 receives the RF signals and acquires reference information from them. In accordance with this representative embodiment, the reference information comprises far field phase values. The second receiver 121 inputs the far field phase values to the processing logic 114. The processing logic 114 performs a correction algorithm that uses the far field phase values to correct the near field phase values for phase drift between the LO (not shown) of the DUT 101 and the LO of the test system 200.

For any fixed Y position of the wand 111, the far field amplitude and phase values received by the second receiver 121 are stable except for phase drift between the LO of the DUT 101 and the LO of the test instrument 110. This phase drift, however, is the same phase drift experienced by the first receiver 112 as the array of probe elements 111 is electrically scanned in the X-direction. Therefore, the RF signals, S1, received at the first receiver 112 can be phase-corrected relative to each other simply by subtracting (i.e., referencing) the respective phase values of the RF signals, S2, received by the second receiver 121. The correction algorithm performed by the processing logic 114 performs the phase-correction process as follows.

From one Y position of the wand 111 to the next, i.e., row-to-row, the phase values received at the second receiver 121 are, by themselves, insufficient to determine the correct row-to-row near field relative phase values. This is because each new Y position of the wand 111 presents a new diffraction geometry, and therefore the "transmit-receive link" (i.e., where DUT transmitter 103 is transmitting and the second receiver 121 is receiving) is different for each Y position. Assuming that there are M mechanically accessed rows, corresponding to M different translations in the Y-direction of the wand 111, each of these positions presents a different diffraction geometry. The second receiver 121 collects M independent RF signals, S2, each comprising an amplitude value and a phase value. The relative phase values (the M−1 phase value differences) are suspect due to both the phase drift between the LO of the DUT 101 and the LO of the test instrument 110 and the changes in the diffraction geometry. However, propagation mathematics can be invoked to solve this problem, as will now be described.

The near field intra-row column-to-column (i.e., probe element-to-probe element) relative phase values for each row are known. The near field amplitude values for each and every probe element position are also known. With these known values, the M unknown (or untrusted) near field phase values can be solved for mathematically as follows. Using well-known wave propagation mathematics, essentially the Fourier transform, a guess of a trial set of M row phase values for each Y position of the wand 111 is made and mathematically propagated through the lens 122 to the second receiver 121. A determination is then made as to whether the mathematical result equals the known amplitude, |S2|, for that position received by the second receiver 121. The phase of S2 is dropped because of its dubiousness.

In brief, each of the M equations is a Fourier transform of the known M-by-N amplitude values, the M sets of known 1-by-N−1 intra-row relative phase values, and the unknown M−1-by-1 inter-row relative phase values. For each Y position of the wand 111, one row of near field amplitude values is blanked (set equal to zero) because of the line-of-sight blockage of the DUT antenna 102 from the second receiver 121 by the wand 111. Assuming the second receiver 121 is on boresight with the DUT 101, all that is needed is the ($k_x$, $k_y$)=(0,0) component of the Fast Fourier (FF) transform, where ($k_x$, $k_y$) is a coordinate pair in k-space, i.e., transverse momentum space. The ($k_x$, $k_y$)=(0,0) component is analogous to the DC component in a time domain-to-frequency domain Fourier transformation. Because the M S2 phase values are unreliable, the M near field DC components in k-space are set equal to the corresponding M measured S2 amplitude values. In matrix notation, the mathematical problem is expressed as:

$$|FT_{2D}(B_k \cdot A_{NF} * \exp(i*\Phi_{NF,intra}+i*\Phi_{NF,inter}))_{0,0}|=|S2_k|$$
$$k=1 \ldots M \quad \text{Equation 1 (M equations),}$$

where $FT_{2D}$ denotes the 2-D Fourier transform, $B_k$ denotes the $k^{th}$ M-by-N blanking matrix, "·" denotes the commutative matrix element-by-matrix element dot product, $A_{NF}$ denotes the M-by-N matrix of amplitude values of the near field probed positions, $\Phi_{NF,intra}$ denotes the M known sets of 1-by-N intra-row near field phase values, $\Phi_{NF,inter}$ denotes the M unknown inter-row near field phase values, (0,0) denotes the k-space DC component, and $S2_k$ denotes RF signal measured by the second receiver 121 for the $k^{th}$ row position. The blanking matrix, $B_k$, is given by:

$$B_k = \begin{matrix} 1 & 1 & \ldots & 1 \\ 1 & 1 & \ldots & 1 \\ & & \ldots & \\ 0 & 0 & \ldots & 0 \quad (k\text{th row}) \\ 1 & 1 & \ldots & 1 \\ & & \ldots & \\ 1 & 1 & \ldots & 1 \quad (\text{row } M) \end{matrix} \quad \text{Equation 2 (M equations)}$$

Formally, this is a system of M nonlinear equations in M unknowns (actually M−1 because of relative phase), which is solvable in a relatively short amount of time by the processing logic 114 for values of M ranging from about 10 to 30, which is what is expected for 5G systems. In accordance with this representative embodiment, this mathematical process is part of the correction algorithm performed by the processing logic 114.

Once the processing logic 114 has solved the M equations, it has all of the near field relative phase values. Because the processing logic 114 already has all of the near field amplitude values, it is able to use the near field relative phase values and the near field amplitude values to compute all of the transmitter properties of the DUT 101, such as, for example, radiation pattern, total radiated power, error vector magnitude (EVM) versus angle, etc. For example, EVM versus angle for a given modulation format can be computed by storing the complex IF data for each of the M-by-N near field modulated signals, S1, obtaining a Fourier transformation of them, and invoking superposition to assemble the I-Q constellation at whatever far field angle in which the user is interested. Alternatively, if a user only wishes to know EVM on boresight, one can simply move the wand 111 out of the way, directly measure boresight EVM in the second receiver 121, and perform the corresponding processing in the processing logic 114. This is because the lens 122, by focusing on the boresight-located second receiver 121, acts as a physical Fourier transformer to far field.

The test system 200 is very compact and very fast compared to existing or proposed test systems for testing DUTs having an integrated antenna and transmitter and no connection port for interconnecting with the DUT antenna. The primary reason for this is that the one-dimensional (1-D) mechanical translation performed by the mechanical translation system 116 is orders of magnitude faster than 2-D mechanical translation performed by existing and/or proposed test systems, such as those that perform 2-D gimballing, for example.

Another way of recovering all of the near field relative phase values without having to solve a set of nonlinear equations is to use a 2-by-N array of probe elements rather than a 1-by-N array of probe elements as the array of probe elements 111. The additional row of probe elements is used to correct errors in the phase values acquired by the second receiver 121 caused by different diffraction geometries created due to translation of the wand, as will be described below in detail with reference to FIGS. 3A and 3B.

FIG. 3A is a block diagram of the test system 300 in accordance with another representative embodiment that is identical to the test system 200 shown in FIG. 2 except that the array of probe elements 111 shown in FIG. 2 has been replaced by a 2-by-N array of probe elements 131 in FIG. 3A. FIG. 3B is a front-view block diagram of the 2-by-N array of probe elements 131 shown in FIG. 3A. In this case, the array of probe elements, or wand, 131 has two parallel rows of probe elements, with each row extending in the X-direction and being aligned in the Y-direction with the other row. The wand 131 has a first, upper row of probe elements 131a and a second, lower row of probe elements 131b, where respective probe elements of the first, upper row 131a and the second, lower row 131b are aligned in the Y-direction.

For ease of explanation, it will be assumed that the wand 131 is translated in the downward Y-direction relative to the drawing page containing FIGS. 3A and 3B. Discrepancies between the signals that are output by probe elements of the first, upper row 131a and the signals that are output by the probe elements of the second, lower row 131b are calibrated out prior to the correction algorithm being performed. After calibration has been performed, the wand is moved in the downward Y-direction to the first Y position. At this Y position of the wand 131, the first receiver 112 (FIG. 2) acquires the S1 signal from the second, lower row of probe elements 131b (i.e., column by column) and sends the corresponding near field amplitude and phase values contained in the S1 signal to the processing logic 114. Simultaneously, the second receiver 121 acquires the S2 signal (i.e., the reference information) and sends the far field phase values contained therein to the processing logic 114. The processing logic 114 then uses the far field phase values to correct the near field phase values acquired by the first receiver 112 (FIG. 2) from the second, lower row of probe elements 131b for phase drift between the LO of the DUT 101 and the LO of the test instrument 110.

However, translation of the wand 131 creates different diffraction geometries with respect to the signal S2 being acquired by the second receiver 121 and being used to correct the near field phase values. The overlap redundancy between the first, upper row of probe elements 131a and the second, lower row of probe elements 131b in the Y-direction is used to obviate the problem associated with the different diffraction geometries created by translation of the wand 131 in the Y-direction, as will now be described.

The wand 131 is translated again in the downward Y-direction such that each probe element of the first, upper row 131a in the new Y position of the wand 131 is positioned where the respective probe element of the second, lower row 131b was positioned in the previous Y position of the wand 131. At this Y position of the wand 131, the first receiver 112 (FIG. 2) acquires the S1 signal output from the first, upper row of probe elements 131a and sends the corresponding near field amplitude and phase values contained in the S1 signal to the processing logic 114. The processing logic 114 then performs the correction algorithm to correct these near field phase values in accordance with the far field phase values acquired by the second receiver 121 at this Y position of the wand 131. Because the phase-corrected near field phase values acquired from the first, upper row of probe elements 131a in the new Y position should be the same as the respective phase-corrected near field phase values acquired from the second, lower row of probe elements 131b in the previous Y position, any discrepancies between the respective phase-corrected near field phase values are due either to phase drift between the LO of the test system 300 and the LO of the DUT 101 or due to the new diffraction geometry created by the new position of the wand 131, but it does not matter which. The correction algorithm performed by the processing logic 114 performs an additional correction that adjusts the phase-corrected near field phase values associated with the first, upper row of probe elements 131a based on the discrepancies, if any. The adjusted, phase-corrected near field phase values are then used as the new phase-corrected near field phase values for the current Y position. This process of making the adjustment to the phase-corrected near field phase values, referred to hereinafter as "phase stitching," is repeated at each of the Y positions to which the wand 131 is translated to generate the M-by-N array of phase-corrected near field phase values.

It should be noted that because the array of probe elements 131 is a 2-by-N array of probe elements, then only M−1 translational Y positions are needed due to the second, lower row of probe elements 131b sampling the $M^{th}$ sampling row of the wand 131 at the $M^{th}$−1 position of the wand 131.

FIG. 4A is a block diagram of the test system 400 in accordance with another representative embodiment that is identical to the test system 300 shown in FIG. 3A except that the 2-by-N array of probe elements 131 shown in FIG. 3A has been replaced by an N+1 array of probe elements 141 in FIG. 4A. FIG. 4B is a front-view block diagram of the N+1 array of probe elements 141 shown in FIG. 4A. In this case, the array of probe elements, or wand, 141 has an upper row of N probe elements 142 extending in the X-direction and an $N^{th}$+1, lower probe element 143 located below any one of the probe elements of the upper row 142 and aligned with that probe element of the upper row 142 in the Y-direction. This embodiment makes use of the fact that only one redundantly sampled X-Y position is needed in order to perform phase stitching. Essentially, any discrepancy between the phase-corrected near field phase value acquired from the lower probe element 143 in the previous Y position of the wand 141 and the phase-corrected near field phase value acquired from the respective probe element of the upper row 142 in the current Y position of the wand 141 is used to further adjust the phase-corrected near field phase values acquired from all of the probe elements of the upper row 142 in the current Y position. The phase stitching process is identical to the phase stitching process described above with reference to FIGS. 3A and 3B except that a single phase-corrected near field phase value associated with the single, lower probe element 143 is used.

Using the single, lower probe element 143 to obtain the value that is needed to perform phase stitching reduces the complexity of the switching logic 113 (FIG. 2) and of the FET tree (not shown) of the wand 141, allowing the wand 141 to be less expensive and smaller in size than the wand 131. In this case, M translational positions in the Y-direction are needed to enable the upper row 142 to access the $M^{th}$ near field sampling row. Another advantage of this embodiment over the embodiment described above with reference to FIGS. 3A and 3B is that the collective sampling time is less: instead of the S1 signal being made up of (M−1)*2N samples, the S1 signal is made up of only M*N+M−1 samples because when the upper row of probe elements 142 is in the $M^{th}$ position, sampling of the lower probe element 143 can be skipped.

Figure 5:
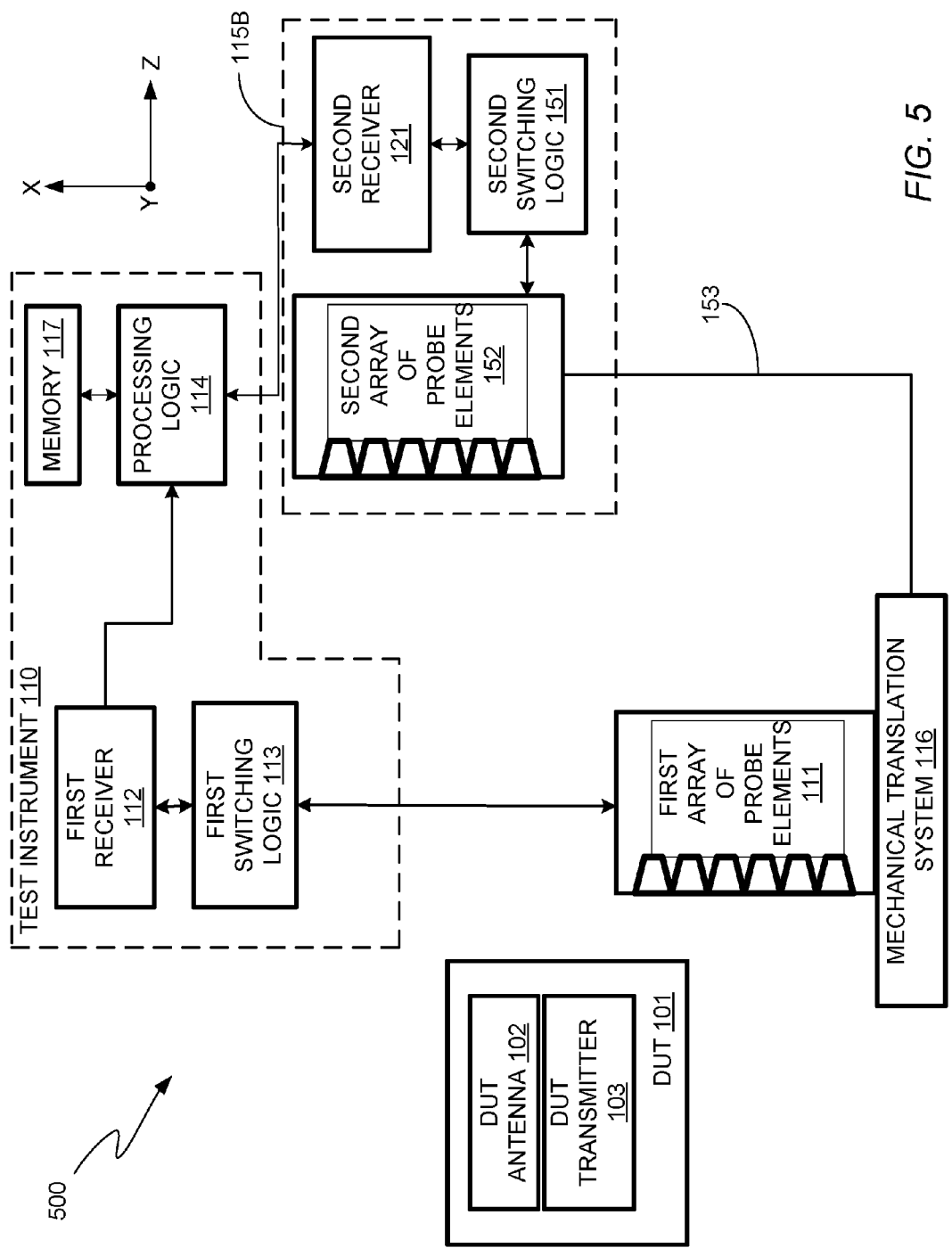
FIG. 5 illustrates a block diagram of the test system in accordance with another representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.

FIG. 5 illustrates a block diagram of the test system 500 in accordance with another representative embodiment for testing the DUT 101. The test system 500 is similar to the test system 200 shown in FIG. 2. However, the reference measurement apparatus 115A shown in FIG. 2 has been replaced in FIG. 5 with a reference measurement apparatus 115B having a configuration that is different from that shown in FIG. 2 and the mechanical translation system 116 is also mechanically coupled to a second array of probe elements 152 of the reference measurement apparatus 115B. In accordance with this representative embodiment, the reference measurement apparatus 115B comprises a second receiver 121, second switching logic 151 and the second array of probe elements 152. Like the first array of probe elements 111, the second array of probe elements 152 has N probe elements and is mechanically translatable in the first direction (i.e., the Y-direction) by the mechanical translation system 116, as indicated by a mechanical linkage 153 between the mechanical translation system 116 and the second array of probe elements 152.

In accordance with another representative embodiment, the first and second arrays of probe elements 111 and 152, respectively, are located in the near field of the DUT antenna 102 and are offset in the second direction (i.e., the X-direction) from one another such that there is no overlap in the second direction between the first and second arrays of probe elements 111 and 152, respectively. Although FIG. 5 depicts the first and second arrays of probe elements 111 and 152, respectively, as being offset from one another in the Z-direction, they typically are not offset from one another in the Z-direction, but are shown this way due to drawing page constraints.

In accordance with this embodiment, the test system 500 holds the second array of probe elements 152 stationary while mechanically translating the first array of probe elements 111 in the first direction over M positions as the first switching logic 113 electrically scans the probe elements of the first array 111 in the second direction to acquire an M-by-N array of first near field values. During the mechanical translation and electrical scanning of the first array of probe elements 111, the second receiver 121 controls the second switching logic 151 to electrically scan the second array of probe elements 152 in the second direction to acquire first reference information from the probe elements of the second array 152.

The test system 500 then holds the first array of probe elements 111 stationary while mechanically translating the second array of probe elements 152 in the first direction over L positions as the second receiver 121 controls the second switching logic 151 to electrically scan the probe elements of the second array 152 in the second direction to acquire an L-by-N array of second near field values, where L is a positive integer that is greater than or equal to 2 and is typically, but not necessarily, equal to M. During the mechanical translation and electrical scanning of the second array of probe elements 152, the first receiver 112 controls the first switching logic 113 to acquire second reference information from the probe elements of the first array 111. The processing logic 114 receives the first and second near field values from the first and second receivers 112 and 121, respectively, and receives the first and second reference information from the second and first receivers 121 and 112, respectively. The first and second reference information includes first and second near field phase values, respectively, and may also include first and second amplitude values, respectively. The processing logic 114 uses the first and second reference information to correct first and second near field phase values, respectively, contained in or derived from the first and second near field values, respectively, acquired by the first and second receivers 112 and 121, respectively, for phase drift between the LO of the DUT 101 and the LO of the test system 500.

Up to this point in the discussion, all of the representative embodiments have been described with reference to mechanical translation of at least one array of probe elements in the first direction while electrically scanning the probe elements in the second direction. The phase drift correction can also be performed using an all-electronic scanning approach that obviates the need to do any mechanical translation, as will now be described with reference to FIG. 6.

Figure 6:
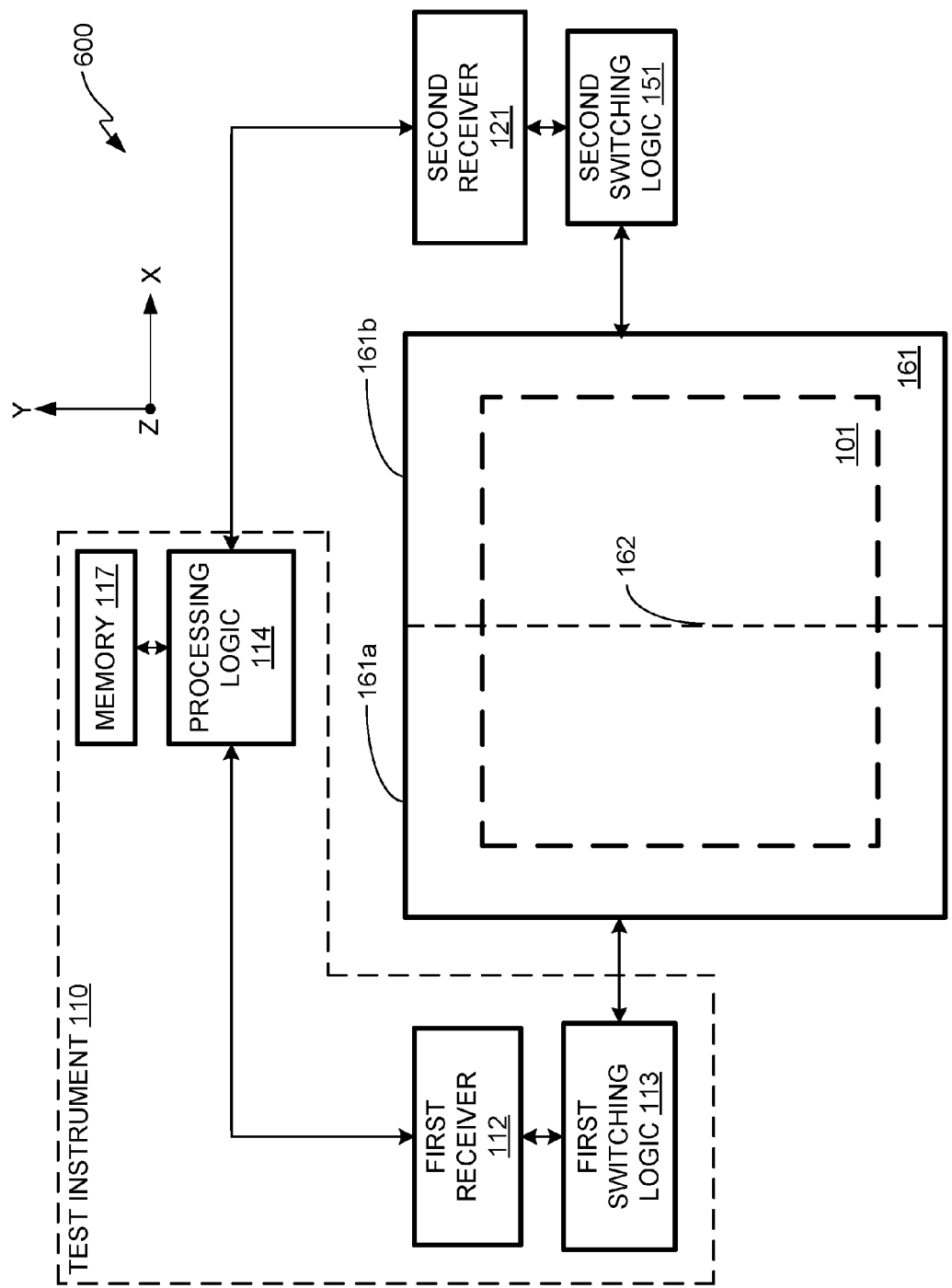
FIG. 6 illustrates a block diagram of the test system in accordance with another representative embodiment for testing a DUT having a DUT antenna and a DUT transmitter that are integrated together and electrically interconnected inside of a package having no externally-accessible antenna connection port for allowing the test system to be electrically interconnected directly with the DUT antenna or with the interconnection between the DUT antenna and the DUT transmitter.

FIG. 6 is a block diagram of the test system 600 in accordance with another representative embodiment in which the bounded radiation surface emitted by the antenna of the DUT 101 is acquired via all-electrical 2-D scanning of the array of probe elements such that no mechanical translation of the array of probe elements is needed. In accordance with this representative embodiment, the array of probe elements 161 is a 2M-by-N array of probe elements, where M and N are positive integers that are greater than or equal to 2. In FIG. 6, M corresponds to the X-direction and N corresponds to the Y-direction. The array of probe elements 161 is mounted on a surface of a circuit board that faces the DUT 101 and that is located in the near field of the DUT 101. The dashed line 162 is intended to indicate that the 2M-by-N array of probe elements is made up of first and second array halves 161*a* and 161*b*, respectively, each having an M-by-N array of probe elements. The test instrument 110 may be identical to the test instrument 110 shown in FIGS. 2 and 5. In accordance with this embodiment, the reference measurement apparatus comprises, during a first 2-D scanning time period, the first receiver 112, the first switching logic 113 and the first array half 161*a*, and during a second 2-D scanning time period, the second receiver 121, the second switching logic 151 and the second array half 161*b*.

In accordance with this embodiment, during the first 2-D scanning time period, the first array half 161*a* acts as part of the reference measurement apparatus while the second array half 161*b* is electrically scanned in the first (Y-) and second (X-) directions to acquire a first M-by-N set of near field values. The first receiver 112 controls the first switching logic 113 to cause it to select a probe element in the first array half 161*a* that produces a sufficiently strong signal to be used for the reference measurement. The second receiver 121 controls the second switching logic 151 to cause it to perform the 2-D scan of the second array half 161*b* to acquire the first M-by-N set of near field values. During the 2-D scan of the second array half 161*b*, the first receiver 112 controls the first switching logic 113 to acquire first reference information from the selected probe element of the first array half 161*a*.

During the second 2-D scanning time period, the first receiver 112 causes the first switching logic 113 to perform a 2-D electrical scan of the first array half 161*a* (i.e., a scan in the first and second directions) to acquire a second M-by-N set of near field values. During the 2-D scan of the first array half 161*a*, the second receiver 121 causes the second switching logic 151 to select a single probe element in the second array half 161*b* producing a sufficiently strong signal to be used for the reference measurement and acquires second reference information from the selected probe element of the second array half 161*b*.

The first and second receivers 112 and 121, respectively, send the second and first M-by-N sets of near field values, respectively, and the first and second reference information, respectively, to the processing logic 114 of the test system 110. The processing logic 114 uses the first reference information to correct a first M-by-N set of near field phase values contained in or derived from the first M-by-N set of near field values for phase drift. The processing logic 114 uses the second reference information to correct a second M-by-N set of near field phase values contained in or derived from the second M-by-N set of near field values for phase drift. In accordance with this embodiment, the first and second reference information are first and second phase values, respectively, that are subtracted from the near field phase values of the first and second M-by-N sets of near field phase values, respectively, to correct for phase drift between the LO of the DUT 101 and the LO of the test system 600.

Anechoic chambers (not shown) that are relatively small in size may be included in the test system to further improve measurement accuracy. For example, anechoic chambers may be used with the test systems 100-400 shown in FIGS. 1-4, respectively. Anechoic chambers are not needed in the test systems 500 and 600 shown in FIGS. 5 and 6, respectively.

Figure 7:
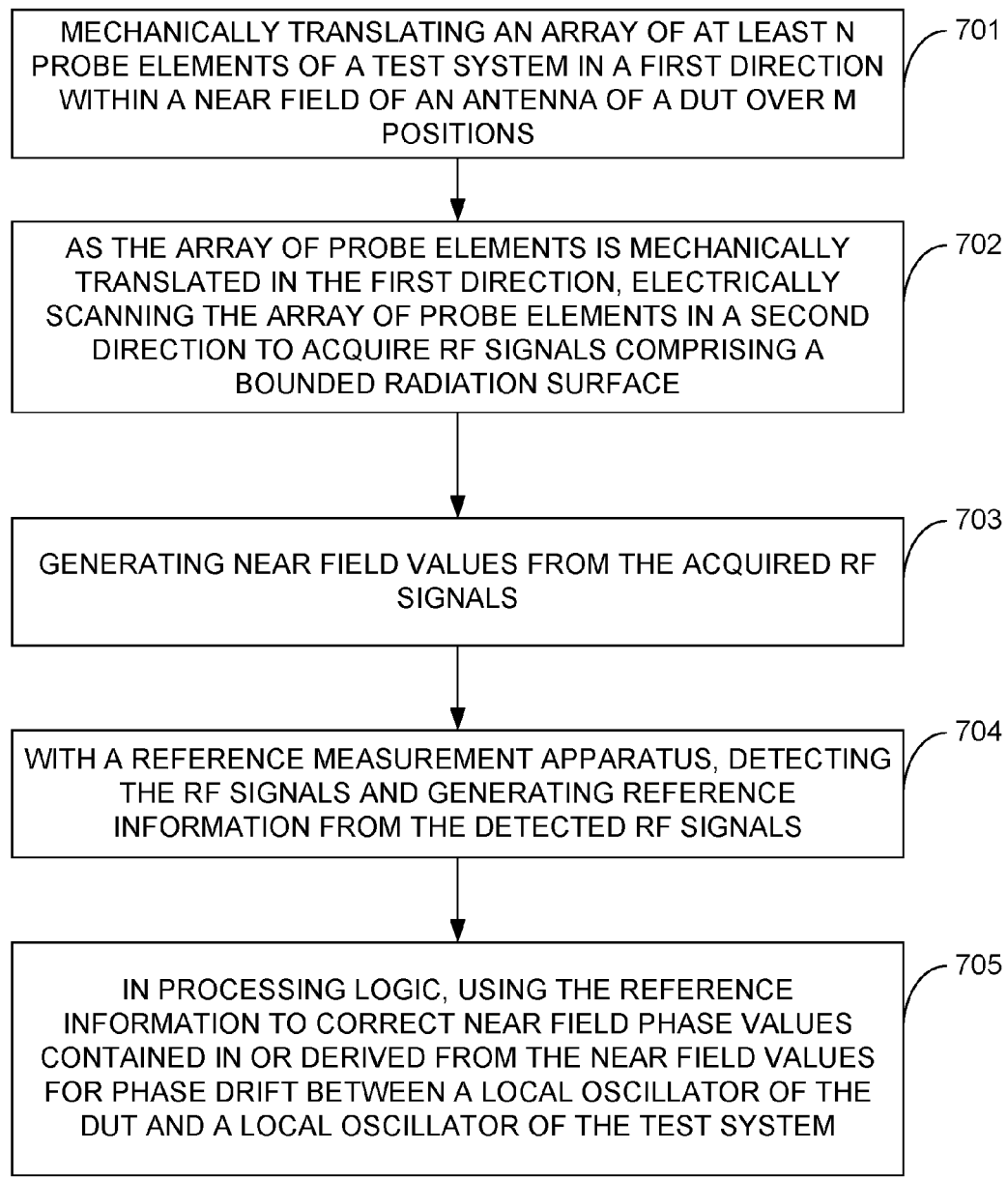
FIG. 7 illustrates a flow diagram representing the test method in accordance with a representative embodiment.

FIG. 7 is a flow diagram of the testing method in accordance with a representative embodiment, which may be performed by, for example, the test system 100 shown in FIG. 1. An array of at least N probe elements of a test system is mechanically translated in a first direction within a near field of the DUT over M positions, as indicated by block 701. As the array of probe elements is mechanically translated in the first direction, the array is electronically scanned in a second direction that is different from the first direction to acquire RF signals comprising a bounded radiation surface, as indicated by block 702. Near field values are generated from the acquired RF signals, as indicated by block 703. With a reference measurement apparatus of the test system, the RF signals are detected and reference information is generated from the RF signals detected by the reference measurement apparatus, as indicated by block 704. Processing logic of the test system uses the reference information to correct near field phase values contained in or derived from the near field values for phase drift between an LO of the DUT and an LO of the test system, as indicated by block 705.

Figure 8:
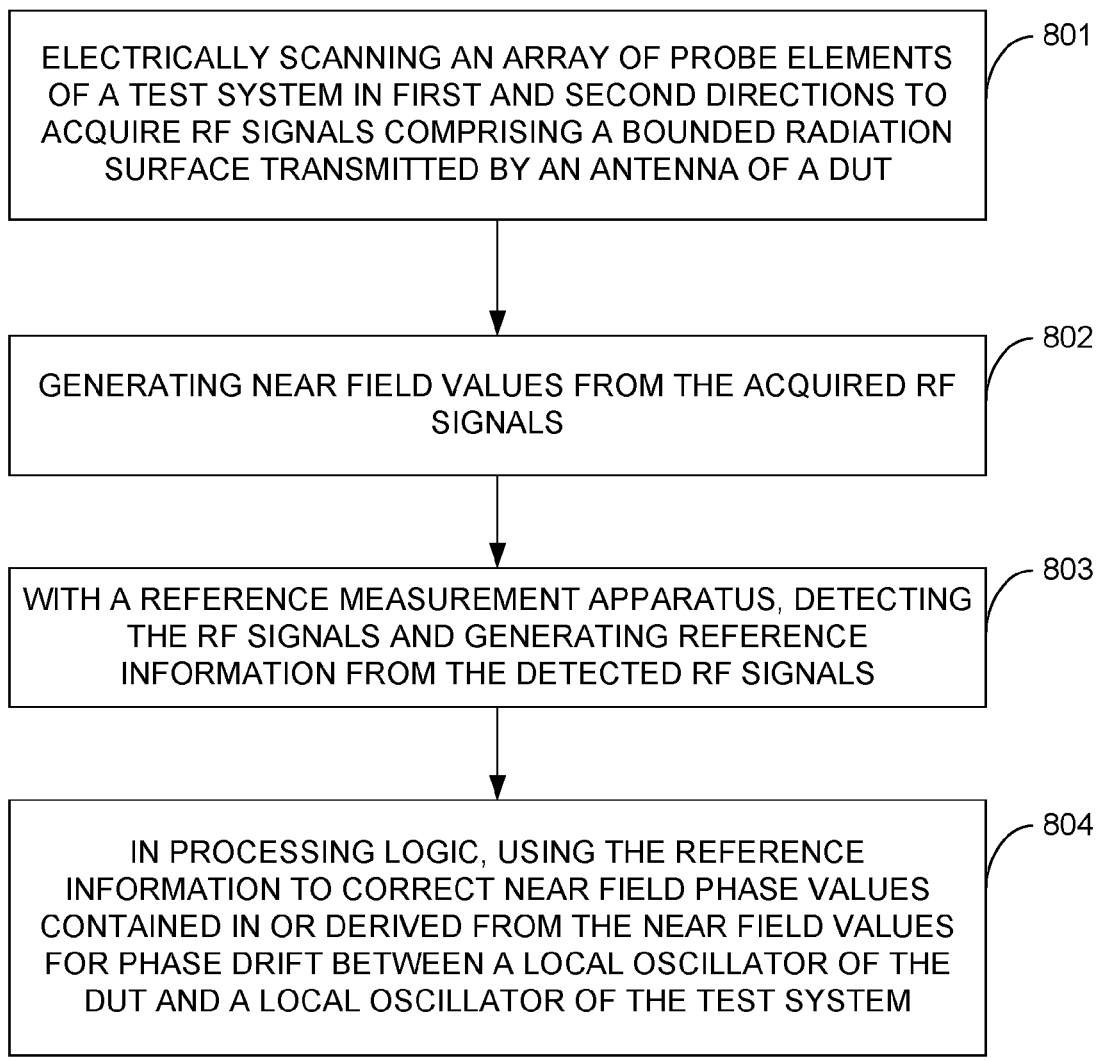
FIG. 8 illustrates a flow diagram representing the test method in accordance with another representative embodiment.

FIG. 8 is a flow diagram of the testing method in accordance with a representative embodiment, which may be performed by, for example, the test system 600 shown in FIG. 6. An array of probe elements of a test system is electronically scanned in first and second directions that are different from one another to acquire RF signals comprising a bounded radiation surface, as indicated by block 801. Near field values are generated from the acquired RF signals, as indicated by block 802. With a reference measurement apparatus of the test system, the RF signals are detected and reference information is generated from the RF signals detected by the reference measurement apparatus, as indicated by block 803. Processing logic of the test system uses the reference information to correct near field phase values contained in or derived from the near field values for phase drift between an LO of the DUT and an LO of the test system, as indicated by block 804.

The methods described above may be implemented in hardware, software or a combination of hardware, software and/or firmware. In cases where the methods are implemented in a combination of hardware and software and/or firmware, the software and/or firmware computer code is stored in one of the aforementioned non-transitory computer-readable mediums that are accessible or are part of the processing logic 114.

Many modifications to the method described above with respect to FIG. 7 are possible, such as those described above with reference to FIGS. 2-5, for example. Likewise, many modifications to the method described above with respect to FIG. 8 are possible. While the representative embodiments have been described with reference to mechanical translation or electrical scanning in a first direction and electrical scanning in the second direction, various combinations of mechanical translation and/or electrical scanning may be employed to achieve goals consistent with the inventive principles and concepts described herein, as will be understood by those of skill in the art in view of the description being provided herein.

While the invention has been illustrated and described in detail in the drawings and foregoing description, such illustration and description are to be considered illustrative or exemplary and not restrictive; the invention is not limited to the disclosed embodiments. For example, the systems 100-600 shown in FIGS. 1-6 are a few of many possible configurations that may be used to perform the inventive methods, as will be understood by persons of skill in the art in view of the description provided herein. As indicated above, variations may also be made to the methods described herein. For example, the order of some of the steps represented by some of the blocks in FIGS. 7 and 8 can be changed. These and other modifications may be made, as will be understood by those skilled in the art in view of the present disclosure.

What is claimed is:

1. A test system for performing over-the-air (OTA) testing of a device under test (DUT) having a DUT transmitter and a DUT antenna that are integrated together in a package that does not include a connection port for interfacing the test system with the DUT antenna, the DUT transmitter generating radio frequency (RF) signals comprising a bounded radiation surface that are transmitted over the air by the DUT antenna, the test system comprising:

a first array of at least N probe elements positioned in a near field of the DUT antenna, where N is a positive integer that is greater than or equal to 2, each of the probe elements detecting the RF signals and generating respective electrical signals comprising first near field values;

a reference measurement apparatus, the reference measurement apparatus acquiring at least first reference information from the RF signals;

a mechanical translation system; and a test instrument comprising a first receiver, first switching logic, and processing logic, the mechanical translation system mechanically translating the first array of at least N probe elements in at least a first direction over M positions within the near field of the DUT antenna while the first receiver causes the first switching logic to electrically scan the first array of N probe elements in at least a second direction that is different from the first direction to acquire an M-by-N array of said first near field values, where M is a positive integer that is greater than or equal to 2, the processing logic being configured to use said first reference information to phase correct first near field phase values contained in or derived from said M-by-N array of said first near field values for phase drift between a local oscillator (LO) of the DUT and an LO of the test system.

2. The test system of claim 1, wherein the first reference information comprises first far field amplitude values and the first near field values comprise near field amplitude values, and wherein the first near field phase values are derived by the processing logic from the first near field and first far field amplitude values.

3. The test system of claim 1, wherein the reference measurement apparatus comprises:

a second receiver; and a lens disposed in between the DUT and the second receiver and creating an effect that the second receiver is positioned in a far field of the DUT antenna, said first reference information including first far field values contained in the RF signals received by the second receiver, the processing logic using said first far field values to phase correct said first near field phase values.

4. The test system of claim 3, wherein the first array of at least N probe elements comprises a 1-y-N array of probe elements aligned with one another in the second direction.

5. The test system of claim 3, wherein the first array of at least N probe elements comprises an N+1 array of probe elements comprising an upper row of N probe elements aligned with one another in the second direction and at least one lower probe element that is aligned in the first direction with one of the probe elements of the upper row, the processing logic being configured to use the phase-corrected first near field phase value associated with the electrical signal generated by said at least one lower probe element to adjust the phase-corrected first near field phase values associated with the electric signals generated by the probe elements of the upper row.

6. The test system of claim 3, wherein the first array of at least N probe elements comprises a 2-by-N array of probe elements comprising a first, upper row of probe elements and a second, lower row of probe elements, each row of probe elements having N probe elements aligned with one another in the second direction, the probe elements of the first, upper row of probe elements being aligned with respective probe elements of the second, lower row of probe elements in the first direction, the processing logic being configured to use the phase-corrected first near field phase values associated with the electrical signals generated by the probe elements of the second, lower row to adjust the phase-corrected first near field phase values associated with the electrical signals generated by the probe elements of the first, upper row.

7. The test system of claim 1, wherein the reference measurement apparatus comprises:

a second receiver;

second switching logic; and a second array of at least N probe elements positioned in the near field of the DUT antenna and offset in the second direction from the first array of at least N probe elements such that there is no overlap in the second direction between the first and second arrays of at least N probe elements, the second array of at least N probe elements being aligned with one another in the second direction, the mechanical translation system holding the second array stationary while mechanically translating the first array in at least the first direction over M positions as the first receiver controls the first switching logic to electrically scan the first array in the second direction to acquire said M-by-N array of said first near field values, wherein as the first receiver acquires said M-by-N array of said first near field values, the second receiver acquires said first reference information, and wherein the mechanical translation system holds the first array stationary while mechanically translating the second array in at least the first direction over L positions as the second receiver controls the second switching logic to electrically scan the second array in the second direction to acquire an L-by-N array of second near field values, where L is a positive integer that is greater than or equal to 2, and wherein as the second receiver acquires said L-by-N array of said second near field values, the first receiver acquires second reference information, the processing logic being configured to use the first reference information to phase correct the first near field phase values for phase drift between the LO of the DUT and the LO of the test system, the processing logic being configured to use the second reference information to phase correct second near field phase values contained in or derived from the second near field values for phase drift between the LO of the DUT and the LO of the test system.

8. The test system of claim 1, wherein the first and second directions are orthogonal to one another.

9. A method for performing over-the-air (OTA) testing of a device under test (DUT) having a DUT antenna and a DUT transmitter that are integrated together in a package that does not include a connection port for interfacing the test system with the DUT antenna, the DUT transmitter generating radio frequency (RF) signals comprising a bounded radiation surface that are transmitted over the air by the DUT antenna, the method comprising:

with a mechanical translation system of the test system, mechanically translating a first array of at least N probe elements in at least a first direction over M positions within a near field of the DUT antenna, where N and M are positive integers that are greater than or equal to 2;

with a first receiver and first switching logic of the test system, electrically scanning the probe elements in a second direction that is different from the first direction as the array of at least N probe elements is mechanically translated in the first direction to acquire the RF signals comprising the bounded radiation surface;

in the first receiver of the test system, generating an M-by-N array of first near field values from the acquired RF signals;

with a reference measurement apparatus of the test system, detecting the RF signals and generating first reference information associated with the detected RF signals; and in processing logic of the test system, using the first reference information to phase correct first near field phase values contained in or derived from said M-by-N array of said first near field values for phase drift between a local oscillator (LO) of the DUT and an LO of the test system.

10. The method of claim 9, wherein the reference measurement apparatus comprises a second receiver and a lens, the lens being disposed in between the DUT and the second receiver and creating an effect that the second receiver is positioned in a far field of the DUT antenna, said first reference information including first far field values contained in the RF signals detected by the reference measurement apparatus, the processing logic using said first far field values to phase correct said first near field phase values.

11. The method of claim 10, wherein the first array of at least N probe elements comprises a 1-by-N array of probe elements aligned with one another in the second direction.

12. The method of claim 10, wherein the first array of at least N probe elements comprises an N+1 array of probe elements comprising an upper row of N probe elements aligned with one another in the second direction and at least one lower probe element that is aligned in the first direction with one of the probe elements of the upper row of probe elements, the method further comprising:

in the processing logic, using the phase-corrected first near field phase value associated with the electrical signal generated by said at least one lower probe element to adjust the phase-corrected first near field phase values associated with the electrical signals generated by the probe elements of the upper row.

13. The method of claim 10, wherein the first array of at least N probe elements comprises a 2-by-N array of probe elements comprising a first, upper row of probe elements and a second, lower row of probe elements, each row of probe elements having N probe elements aligned in the second direction, the probe elements of the first, upper row of probe elements being aligned with respective probe elements of the second, lower row of probe elements in the first direction, the method further comprising:

in the processing logic, using the phase-corrected first near field phase values associated with the electrical signals generated by the probe elements of the second, lower row to adjust the phase-corrected first near field phase values associated with the electrical signals generated by the probe elements of the first, upper row.

14. The method of claim 9, wherein the reference measurement apparatus comprises a second receiver, second switching logic, and a second array of at least N probe elements positioned in the near field of the DUT antenna and offset in the second direction from the first array of at least N probe elements such that there is no overlap in the second direction between the first and second arrays of at least N probe elements, the second array of at least N probe elements being aligned with one another in the second direction, the method further comprising:

with the mechanical translation system, holding the second array stationary while mechanically translating the first array in at least the first direction over M positions as the first receiver controls the first switching logic to electrically scan the first array in the second direction to acquire said M-by-N array of said first near field values;

with the second receiver, as the first receiver acquires said M-by-N array of said first near field values, acquiring said first reference information;

with the mechanical translation system, holding the first array stationary while mechanically translating the second array in at least the first direction over L positions as the second receiver controls the second switching logic to electrically scan the second array in the second direction to acquire an L-by-N array of second near field values, where L is a positive integer that is greater than or equal to 2;

with the first receiver, as the second receiver acquires said L-by-N array of said second near field values, acquiring second reference information;

in the processing logic, using the first reference information to phase correct the first near field phase values for phase drift between the LO of the DUT and the LO of the test system; and in the processing logic, using the second reference information to phase correct second near field phase values contained in or derived from the second near field values for phase drift between the LO of the DUT and the LO of the test system.

15. The method of claim 9, wherein the first and second directions are orthogonal to one another.

16. The method of claim 9, wherein the first reference information comprises first far field amplitude values and the first near field values comprise first near field amplitude values, and wherein the first near field phase values are derived by the processing logic from the first near field and first far field amplitude values.

17. A computer program embodied on a non-transitory computer-readable medium, the computer program comprising instructions for execution by a processor for correcting near field phase values when performing over-the-air (OTA) testing of a device under test (DUT) having a DUT transmitter and a DUT antenna tandem that are integrated together in a package that does not include an accessible connection port for interfacing the test system with the DUT antenna, the DUT transmitter generating radio frequency (RF) signals that are transmitted over air by the DUT antenna, the computer program comprising:

a first code segment that receives first near field values from a first receiver of the test system, the first near field values being contained in electrical signals generated by probe elements of a first array of at least N probe elements of the test system positioned in a near field of the DUT antenna and mechanically translated in at least a first direction over M positions while being electrically scanned in a second direction that is different from the first direction, where N and M are positive integers that are greater than or equal to 2;

a second code segment that receives first reference information generated by a reference measurement apparatus of the test system that detects the RF signals and generates the first reference information therefrom; and a third code segment that uses the first reference information to phase correct first near field phase values contained in or derived from said first near field values for phase drift between a local oscillator (LO) of the DUT and an LO of the test system.

18. The computer program of claim 17, wherein said first reference information includes first far field values contained in the RF signals detected by the reference measurement apparatus, the processing logic using said first far field values to phase correct said first near field phase values.

19. The method of claim 18, wherein the first array of at least N probe elements comprises an N+1 array of probe elements comprising an upper row of N probe elements aligned with one another in the second direction and at least one lower probe element that is aligned in the first direction with one of the probe elements of the upper row of probe elements, and wherein the first code segment further comprises:

a first code portion that uses the phase-corrected first near field phase value associated with the electrical signal generated by said at least one lower probe element to adjust the phase corrected first near field phase values associated with the electrical signals generated by the probe elements of the upper row.

20. The computer program of claim 18, wherein the first array of at least N probe elements comprises a 2-by-N array of probe elements comprising a first, upper row of probe elements and a second, lower row of probe elements, each row of probe elements having N probe elements aligned in the second direction, the probe elements of the first, upper row of probe elements being aligned with respective probe elements of the second, lower row of probe elements in the first direction, the first code segment further comprising:

a first code portion that uses the phase-corrected first near field phase values associated with the electrical signals generated by the probe elements of the second, lower row to adjust the phase-corrected first near field phase values associated with the electrical signals generated by the probe elements of the first, upper row.

* * * * *